US006535687B1

(12) United States Patent
Tinker et al.

(10) Patent No.: US 6,535,687 B1
(45) Date of Patent: Mar. 18, 2003

(54) METHOD AND SYSTEM FOR DETERRING ELECTRONIC VIDEO PIRACY THROUGH IMAGE REARRANGEMENT

(75) Inventors: Michael Tinker, Yardley, PA (US); Glenn Arthur Reitmeier, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/591,966

(22) Filed: Jun. 12, 2000

Related U.S. Application Data

(60) Provisional application No. 60/145,306, filed on Jul. 23, 1999.

(51) Int. Cl.[7] ................................................. H04N 5/91
(52) U.S. Cl. ...................................... 386/94; 380/268
(58) Field of Search ............................. 386/46, 94, 95, 386/91, 112; 380/203, 210, 215, 214, 217, 224, 268

(56) References Cited

U.S. PATENT DOCUMENTS

| | | | | |
|---|---|---|---|---|
| 4,563,702 A | | 1/1986 | Heller et al. ................. 358/119 |
| 4,575,754 A | * | 3/1986 | Bar-Zohar .................. 380/215 |
| 5,191,609 A | * | 3/1993 | Mun .......................... 380/214 |
| 5,303,294 A | * | 4/1994 | Kimoto et al. ................. 386/94 |
| 5,321,748 A | * | 6/1994 | Ziedler et al. ............... 380/214 |
| 5,335,275 A | | 8/1994 | Millar et al. ..................... 380/4 |
| 5,535,275 A | * | 7/1996 | Sugisaki et al. ............. 380/203 |
| 5,546,461 A | * | 8/1996 | Ibaraki et al. ............... 380/217 |
| 5,608,533 A | * | 3/1997 | Okamoto et al. ............. 386/91 |

FOREIGN PATENT DOCUMENTS

| | | | |
|---|---|---|---|
| EP | 0 277 451 | 8/1988 | ............ H04N/5/74 |
| EP | 0 588 535 | 3/1994 | ............ H04N/5/91 |
| EP | 0 805 599 | 11/1997 | ............ H04N/7/50 |
| EP | 0 949 815 | 10/1999 | .......... H04N/7/167 |
| WO | 98/27731 | 6/1998 | .......... H04N/7/167 |

* cited by examiner

Primary Examiner—Huy Nguyen
(74) Attorney, Agent, or Firm—William J. Burke

(57) ABSTRACT

A system for deterring unauthorized reproduction of a video presentation including a plurality of images to be displayed and method for operating the system. The system includes an encoder for encoding a signal for transmission over a vulnerable communications link to a decoder. The encoder includes: a first memory having a first plurality of addressable memory locations for storing at each of the locations data corresponding to a portion of at least one of the images to provide an array of data; and, a randomizer for pseudo-randomly addressing the first memory to provide a pseudo-random data signal corresponding to the one of the images. The decoder includes: a second memory having a second plurality of addressable memory locations; and, a derandomizer for receiving the pseudo-random data signal and for pseudo-randomly applying the received data to the second plurality of memory locations corresponding to the original memory location array in the first memory to provide the array of data as stored in the first memory in the second memory locations and being capable of being conventionally addressed to provide a signal for reception by a display device.

18 Claims, 4 Drawing Sheets

METHOD AND SYSTEM FOR DETERRING ELECTRONIC VIDEO PIRACY THROUGH IMAGE REARRANGEMENT

RELATED APPLICATION

This application claims the benefit of U.S. Provisional Application No. 60/145,306, entitled "MEANS OF DEFEATING ELECTRONIC MOVIE PIRACY THROUGH IMAGE REARRANGEMENT", filed on Jul. 23, 1999.

FIELD OF THE INVENTION

The present invention relates to electronic video reproduction systems and more particularly to methods and devices for preventing unauthorized duplication of electronic video presentations.

BACKGROUND OF INVENTION

The present invention is described as it relates to digital movies and their presentation in theatres, however it should be understood to be equally applicable to other digital video presentations methods and systems.

A major problem with digital movies today is piracy, or the unauthorized reproduction thereof. Pirated copies of movies can be found on film and other electronic media, such as video tape, or magnetic or optical disk. Pirated movies are sold around the world and shown without any royalties being paid to the proper persons, e.g. the originators or studio. Accordingly, it is desirable that electronic video presentation systems be as secure as possible and as immune to piracy as possible.

In an electronic video presentation system dedicated to showing digital movies or video presentations, data representative of the movie or video presentation is relatively secure for most parts of the system. FIG. 1 illustrates such a system 10. In referring to the figures, like references designate like elements of the invention.

Referring to FIG. 1, a video presentation such as a movie is typically prepared at a location 20 such as a studio. The movie is typically displayed at a distinct location 30 such as a theatre. Using conventional processing elements 40 at the studio 20, a movie is captured and digitized, and compressed into a bitstream which is then encrypted to provide a secured, digital bitstream 50. The movie is reproducible from the bitstream 50. The encrypted bitstream 50 is transported to a remote location 30 by some means, such as a computer network or physical medium like a magnetic tape or disk, for example. In a theatre 30, the encrypted bitstream 50 is decrypted and decompressed using conventional processing elements 60. The decrypted, decompressed bitstream 70 is fed to projector 80 which displays it on a movie screen for example.

The physical studio 20 can be secured so as to protect the movie from being pirated. Between the studio 20 and theatre 30, the bitstream 50 is encrypted. Hence, even if the bitstream 50 is intercepted or stolen, sufficiently robust encryption techniques exist and are used to prevent easy reproduction of pirated copies of the movie. Within the theatre 30, decryption and decompression, using elements 60, happen almost simultaneously. This typically is provided on the same computer platform which can also be made sufficiently secure using conventional locked housings, or enclosures.

However, over the transmission link between decryption and decompression by elements 60 and projector 80, decrypted and decompressed signal 70 is conventionally a "clear" signal that can potentially be intercepted and stolen using appropriate equipment.

It is an object of the present invention to prevent theft or unauthorized duplication of signal 70 of a video presentation such as a movie.

SUMMARY OF INVENTION

A system and method for operating the system for deterring unauthorized reproduction of a video presentation including a plurality of images to be displayed, the system including: an encoder including: a first memory having a first plurality of addressable memory locations for storing at each of the locations data corresponding to a portion of at least one of the images to provide an array of data; and, a randomizer for pseudo-randomly addressing the first memory to provide a pseudo-random data signal corresponding to the one of the images; and, a decoder including: a second memory having a second plurality of addressable memory locations; and, a derandomizer for receiving the pseudo-random data signal and for pseudo-randomly applying the received data to the second plurality of memory locations corresponding to the original memory location array in the first memory to provide the array of data as stored in the first memory in the second memory locations and being capable of being conventionally addressed to provide a signal for reception by a display device.

BRIEF DESCRIPTION OF THE FIGURES

The advantages and aspects of the present invention will be more fully understood in conjunction with the following detailed description and accompanying drawings, wherein.

DETAILED DESCRIPTION OF THE INVENTION

As will be discussed herein with reference to FIGS. 3 and 4, the present invention basically operates by rearranging at least some if not all of the individual images of the movie transmitted to the projector 80 such that even if stolen, these images cannot be readily reconstituted into a useful reproduction of the movie. As is understood by those possessing ordinary skill in the pertinent art, a digital video or movie includes a series of images or frames displayed sequentially. On film, each image is complete and intact. In a digital movie, each image is made up of pixels. Of course, pixel is short for Picture Element, and is the smallest single addressable element in a graphic image. Each pixel is well defined and arranged in rows and columns to form a two-dimensional array as is well understood. The array of pixels forms the image to be displayed as a frame of the movie. The present invention utilizes the fact each image in a digital movie is divided into pixels, and manipulates the individual images to further protect the movie from piracy.

Figure 1:
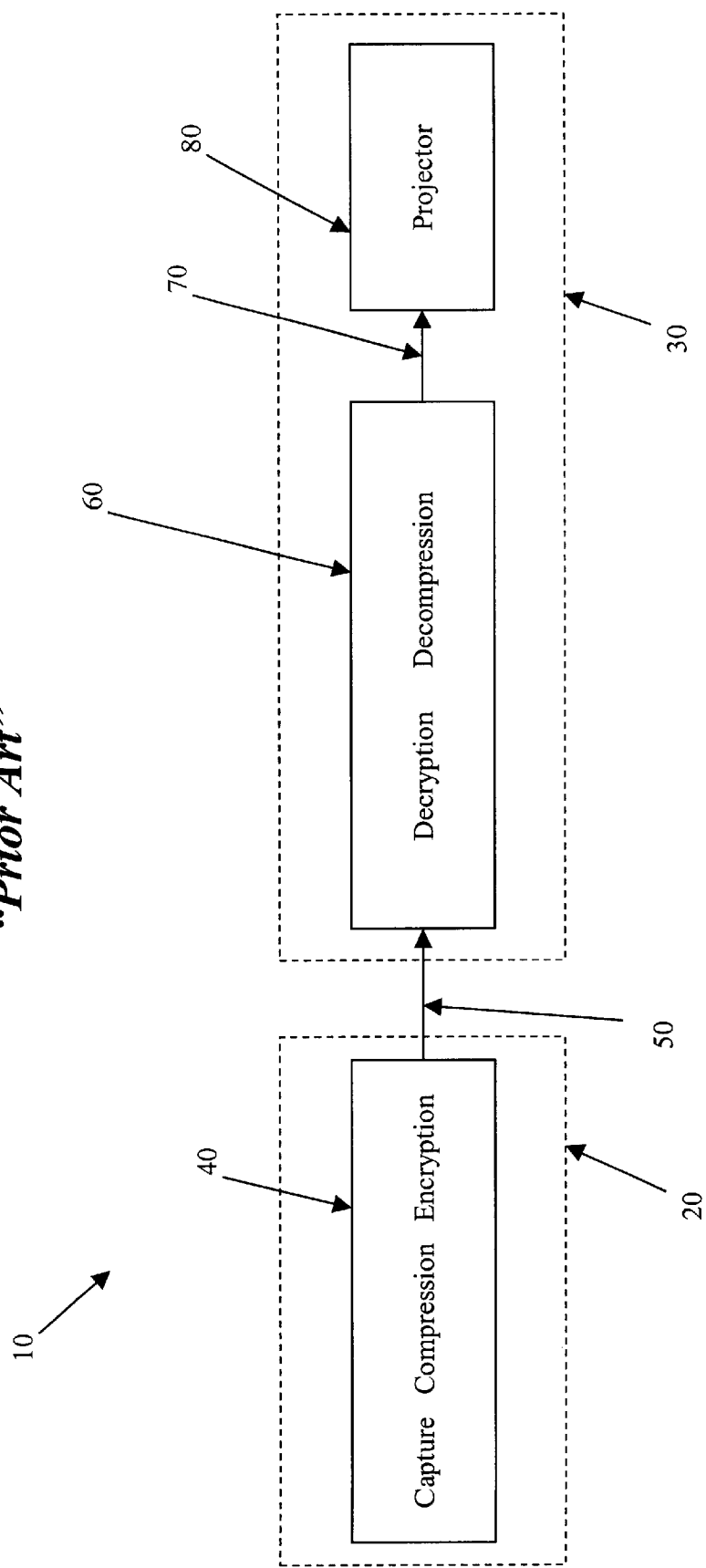
FIG. 1 illustrates a block diagram of a conventional movie production, delivery and presentation system discussed in the background of the invention.
Figure 2:
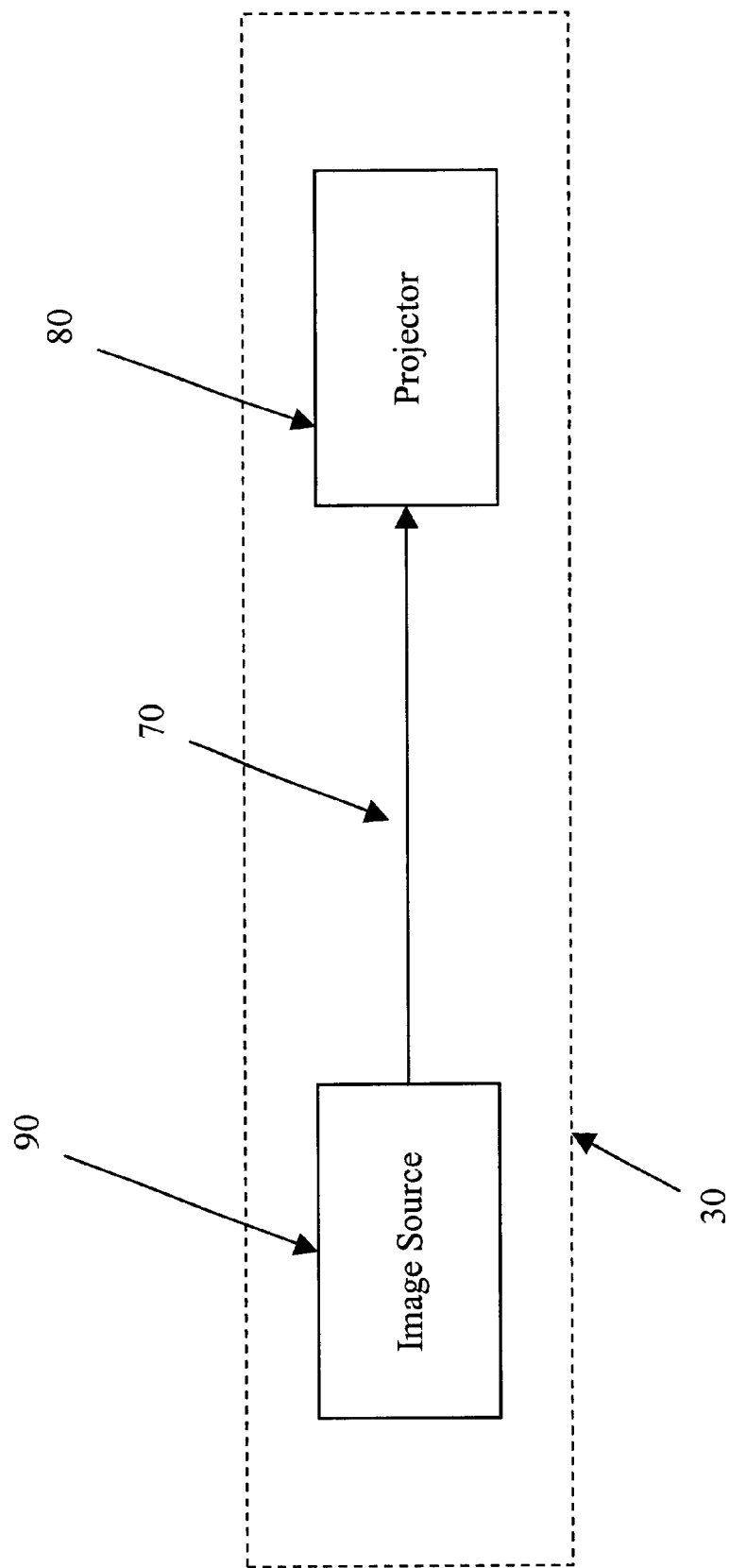
FIG. 2 illustrates a more detailed view of a presentation portion of the system of FIG. 1.

Referring now to FIG. 2, therein is illustrated a block diagram of apparatus provided in a theatre 30 which includes image source 90 and projector 80. Image source 90 can take the form of decryptor and decompressor 60 as illustrated in FIG. 1, or any other suitable configuration for providing digital images to projector 80. Image source 90 provides digital signal 70 to projector 80. As was discussed, the signal 70 includes pixels which make up the individual images of the movie displayed by the projector 80, frame by frame. Depending on the projector 80, the pixels corresponding to any given image in the signal 70 may be displayed simultaneously or sequentially as in a raster scan. In either case, each image is transmitted in signal 70 as individual pixels or blocks of pixels in a fixed order which does not change from image to image, (e.g. frame to frame).

The present invention prevents piracy of signal 70 and hence the movie displayed using projector 80 by varying the order of the pixels or blocks of pixels of each image in the signal 70 in a random manner from image to image.

Figure 3:
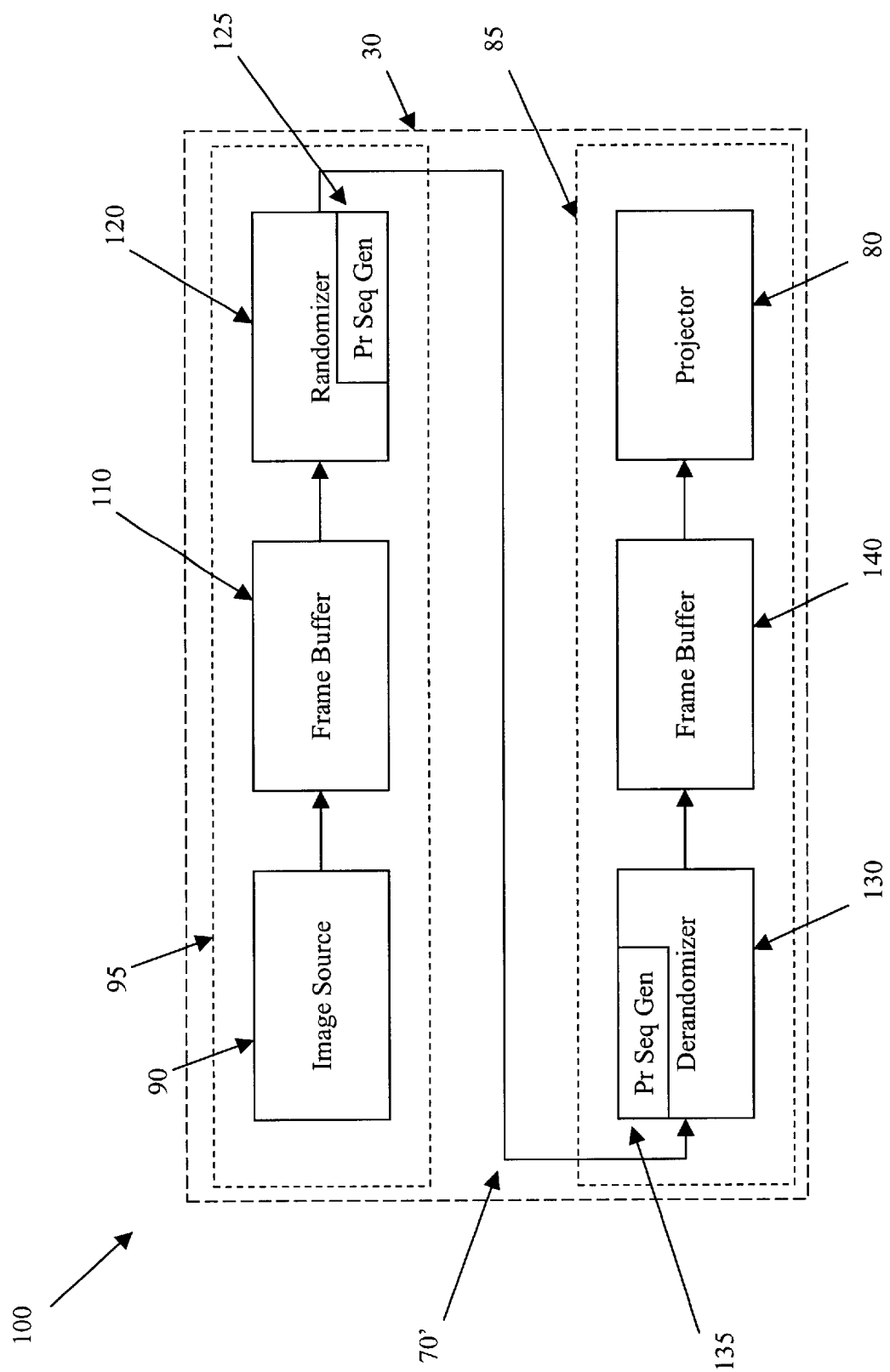
FIG. 3 illustrates the presentation portion of FIG. 2, adapted according to a preferred form of the present invention; and, FIG. 4 illustrates rearrangement of an image or frame of a movie according to the present invention.

Referring now to FIG. 3, therein is illustrated a configuration 100 including the theatre 30 configuration of FIG. 2 adapted according to the present invention to prevent unauthorized duplication of the signal 70'. The configuration 100 includes frame buffer 110 and randomizer 120. An input of the frame buffer 110 is coupled to an output of the image source 90. The output of the frame buffer 110 is coupled to an input of randomizer 120. Signal 70' is transmitted between an output of randomizer 120 and an input of derandomizer 130 as is illustrated in FIG. 3. An output of the derandomizer 130 is coupled to an input of frame buffer 140 and an output of the frame buffer 140 is coupled to an input of projector 80.

In a preferred embodiment of the present invention, frame buffer 110 and randomizer 120 are in close physical proximity to image source 90, and preferably located in the same housing or enclosure 95 as the image source 90.

According to the present invention, image source 90 provides an output to frame buffer 110. Frame buffer 110 holds at least part of each image output from image source 90. As is understood by those possessing ordinary skill in the pertinent art, frame buffers 110 and 140 each include an array of addressable memory locations which each has a unique identifier or memory address assigned to it. Frame buffers and storage devices and memories are of course well known and widely employed in the video related arts. Randomizer 120 accesses contents of the memory addresses of frame buffer 110 in a pseudo-random manner and writes the contents of these pseudo-randomly accessed addresses sequentially as part of signal 70'.

As is well understood, a pseudo-random number generator can be used to generate a pseudo-random sequence that satisfies statistical tests for randomness. The random sequence provided by these types of generators can be repeated by starting from the same starting point. By using a pseudo-random sequence to control the order of access and read-out of data as stored by the frame buffer 110, a pseudo-randomized version of each image or frame that make up the movie to be displayed by projector 80 is transmitted as signal 70' on the vulnerable link between image source 90 and projector 80. Hence the signal 70' is randomized and less likely, if intercepted, to be effectively used than is signal 70 of FIG. 2. Each image or frame of the movie which was randomized using frame buffer 110, randomizer 120 and pseudo-random sequence generator 125 is reconstructed using derandomizer 130, pseudo-random sequence generator 135 and frame buffer 140.

The derandomizer 130 uses pseudo-random sequence generator 135 to generate the same pseudo-random sequence as was utilized by the randomizer 120 and pseudo-random sequence generator 125, to apply the randomized data in signal 70', corresponding to an image, to the appropriate memory addresses of frame buffer 140. In other words, data is read-out from memory addresses of frame buffer 110 selected according to a pseudo-random sequence and applied to memory addresses of frame buffer 140 selected according to the same pseudo-random sequence. After being applied and stored in the frame buffer 140, the data is then supplied in a conventional manner to the projector 80 which displays the corresponding image. Thus, for any given image of a movie, data corresponding to that image is stored in identical corresponding addresses in the frame buffers 110 and 140 as that data is conventionally supplied to frame buffer 110, pseudo-randomly read out from frame buffer 110, applied to frame buffer 140 utilizing the same pseudo-random sequence as was used to read frame buffer 110, and conventionally read-out from frame buffer 140.

It should be understood, that unlike image source 90 which may take the form of conventional decryptor/decompressor 60 and require significant processing capabilities and a physically large computing platform, derandomizer 130 and frame buffer 140 can be made relatively physically smaller, and hence suitable for placement within a typical projector 80 enclosure 85 without significant modifications being made thereto. In a preferred form of the present invention, the derandomizer 130 and frame buffer 140 are physically positioned within the projector 80 housing, or enclosure 85.

Figure 4:
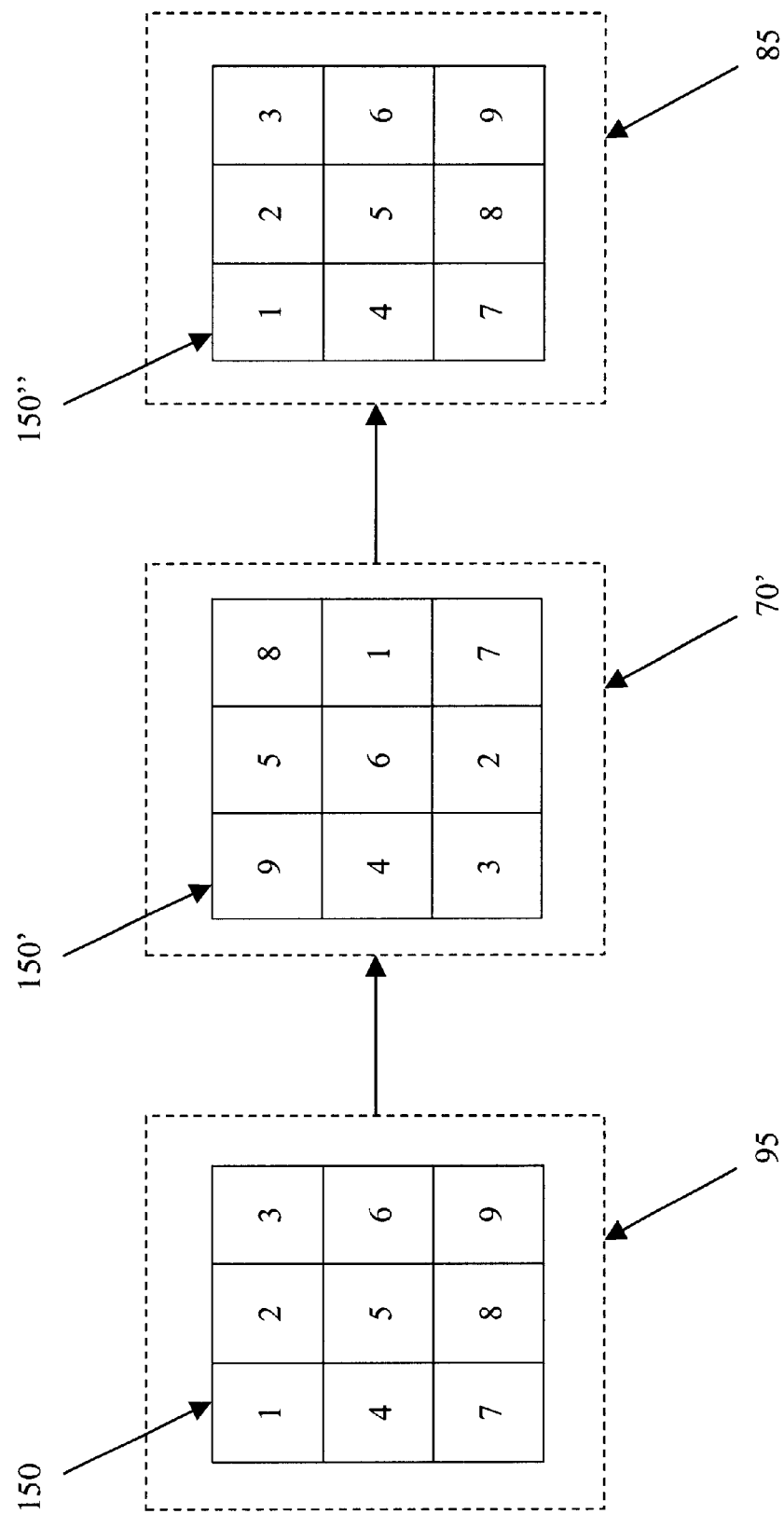

Referring now to FIG. 4, there is illustrated an example of how an individual image or frame 150 of a movie can be rearranged according to the present invention for transmission as part of signal 70'. Using the pseudo-random sequence, images 150 or frames of the movie to be displayed using projector 80 can advantageously be rearranged according to the present invention differently in a random manner. It should also be understood while the discussion of the present invention hereto has been as it relates to individual pixels, the block size or size of a pixel group, utilized for randomization, can vary from a substantial portion of each image down to individual pixels depending upon particular design criteria.

For example, in digital videos the use of macroblocks, four blocks of luminance, one $C_r$ block and one $C_b$ block is well known. In a preferred form of the present invention, individual macroblocks are rearranged using the methodology set forth hereto.

Referring still to FIG. 4 therein is illustrated an original image 150 supplied by image source 90. Image 150 includes groups of pixels 1–9. Analogously, reconstructed image 150" provided by frame buffer 140 to projector 80 also includes groups of pixels 1–9 in the same order and respective positions as in image 150. It should be understood images 150 and 150" are respectively protected within image source enclosure 95 and projector enclosure 85. Accordingly, the more robust enclosures 85 and 95 are, the more secure images 150 and 150" are. Image 150' is a representation of image 150 which has been rearranged according to the present invention for transmission as part of signal 70'. As set forth, a pseudo-random sequence utilized by randomizer 120 and derandomizer 130 is necessary for proper de-arranging to generate image 150". As can be seen in FIG. 4, the relative arrangement of pixel groups 1–9 in image 150' is changed dependent upon the utilized pseudo-random sequence as compared to the relative arrangement of pixel groups 1–9 in image 150. For example, pixel group 9 in image 150' has taken the relative position of pixel group 1 in image 150. Likewise, pixel group 1 in image 150' has take the relative position of pixel group 6 in image 150 for example. It should be understood this particular pixel group rearrangement is for purposes of illustration only, as in a preferred embodiment the relative arrangement of pixel groups can change from image to image, or frame to frame.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. In a video reproduction system including an image source for supplying digital data in a given order for each of a plurality of images to be displayed and a display device for displaying said plurality of images using said digital data, a method for frustrating unauthorized duplication of said plurality of images, in combination therewith said method comprising:

separately rearranging said digital data corresponding to at least some of said plurality of images to provide a rearranged sequence of digital data incapable of providing a proper display of said at least some images when directly applied to said display device; and, reordering said rearranged sequence of data according to said given order to provide said digital data in said given order for said at least some of said plurality of images;

wherein said rearranging comprises:

storing data corresponding to at least a part of said at least one image in said given order in a first memory device; and, dependently upon a pseudo-random sequence, reading said data out from said first memory device as part of a bitstream.

2. In a video reproduction system including an image source for supplying digital data in a given order for each of a plurality of images to be displayed and a display device for displaying said plurality of images using said digital data, a method for frustrating unauthorized duplication of said plurality of images, in combination therewith said method comprising:

separately rearranging said digital data corresponding to at least some of said plurality of images to provide a rearranged sequence of digital data incapable of providing a proper display of said at least some images when directly applied to said display device; and, reordering said rearranged sequence of data according to said given order to provide said digital data in said given order for said at least some of said plurality of images;

wherein said rearranging comprises: storing data corresponding to at least a part of said at least one image in said given order in a first memory device; and, dependently upon a pseudo-random sequence, reading said data out from said first memory device as part of a bitstream; and, wherein said reordering comprises: storing said bitstream in a second memory device according to said pseudo-random sequence; and, reading said data out from said second memory device in a same order as it was stored in said first memory device.

3. The method of claim 2, wherein each of said images is divided into a plurality of macroblocks, and said rearranging said digital data comprises changing the position of said macroblocks relative to one another.

4. A system for deterring unauthorized reproduction of a video presentation including a plurality of images to be displayed, said system comprising:

an encoder including: a first memory having a first plurality of addressable memory locations for storing at each of said locations data corresponding to a portion of at least one of said images to provide an array of data; and, a randomizer for pseudo-randomly addressing said first memory to provide a pseudo-random data signal corresponding to said one of said images; and, a decoder including: a second memory having a second plurality of addressable memory locations; and, a derandomizer for receiving said pseudo-random data signal and for pseudo-randomly applying said received data to said second plurality of memory locations to provide said array of data as stored in said first memory in said second memory locations and being capable of being conventionally addressed to provide a signal for reception by a display device.

5. The system of claim 4, further comprising:

an image source positioned within a first housing and coupled to said first memory for applying digital data corresponding to said images to said first memory; and, a display device at least partially contained within a second housing and being coupled to said second memory device for receiving said digital data from said second memory device;

wherein said encoder is secured within said first housing and said decoder is secured within said second housing.

6. The system of claim 5, wherein said display device is a projector and said second housing is a projector housing.

7. The system of claim 5, wherein said first memory stores at least a portion each of said images as it is output from said image source.

8. The system of claim 5, wherein said randomizer accesses and reads from said first memory according to a pseudo-random sequence to provide data for said signal.

9. The system of claim 8, wherein said derandomizer applies said signal to said second memory according to said sequence.

10. A method for deterring copying of a plurality of images which compose a video presentation when displayed, said method comprising securing at least one of said images, said securing comprising:

providing data representative of said at least one of said images;

storing at least a portion of said data in a first plurality of memory addresses in a given order;

reading said data from said first plurality of memory addresses in a pseudo-random order different from said given order to provide a signal including data in said pseudo-random order;

applying said signal to a second plurality of memory addresses according to said pseudo-random order; and, reading said applied data from said second memory addresses in said given order.

11. The method of claim 10, further comprising securing a majority of said plurality of images.

12. The method of claim 10, further comprising securing each of said plurality of images.

13. The method of claim 10, further comprising displaying said plurality of images sequentially as a video presentation using said read data from said second memory device and a display device.

14. The method of claim 13, further comprising securing said first memory within a same enclosure as a source for said providing said data and securing said second memory within a same enclosure as said display device.

15. The method of claim 14, wherein said display device is a projector.

16. The method of claim 14, wherein said image is divided into a plurality of macroblocks, and data corresponding to said macroblocks are individually stored, read and applied.

17. The method of claim 14, wherein said image is divided into a plurality of pixels, and data corresponding to said pixels are individually stored, read and applied.

18. A method for deterring unauthorized theft of frames which compose a video presentation when displayed, said method comprising:

dividing each of said frames into a plurality of portions;

storing data corresponding to at least two of said portions of one of said frames in a first memory in a given order;

pseudo-randomly rearranging said stored data dependently upon a sequence to provide a signal such that if said signal is directly provided to a display device said portions are visually displaced with respect to a proper relative positioning thereof;

transmitting said rearranged data to said display device; and, applying said received, rearranged data to a second memory dependently upon said sequence, thereby storing said received data in said second memory in said given order such that said data may be read from said second memory and said one of said frames displayed using said display device.

* * * * *